United States Patent
Klatt et al.

[11] Patent Number: 5,993,261
[45] Date of Patent: Nov. 30, 1999

[54] ADAPTOR FOR CONTACTING CARD-SHAPED SUPPORTS

[75] Inventors: Dieter Klatt, Wülfrath; Bernhard Pelke, Wuppertal, both of Germany

[73] Assignee: Stocko Metallwarenfabriken Henkels und Sohn GmbH & Co., Wuppertal, Germany

[21] Appl. No.: 08/994,072

[22] Filed: Dec. 19, 1997

[30] Foreign Application Priority Data

Mar. 19, 1997 [DE] Germany ............... 297 04 984 U

[51] Int. Cl.$^6$ ..................................... H01R 17/00
[52] U.S. Cl. ............................. 439/630; 439/660
[58] Field of Search .................... 439/625, 626, 439/628, 629, 630, 631, 632, 660

[56] References Cited

U.S. PATENT DOCUMENTS

| | | | |
|---|---|---|---|
| 5,599,203 | 2/1997 | Broschard, III et al. | 439/489 |
| 5,620,342 | 4/1997 | Kinross | 439/637 |
| 5,667,408 | 9/1997 | Broschard, III et al. | 439/630 |

FOREIGN PATENT DOCUMENTS

| | | |
|---|---|---|
| 0704813 | 9/1995 | European Pat. Off. . |
| 4310517 | 10/1994 | Germany . |
| 1952994 | 3/1996 | Germany . |
| 2960725 | 8/1996 | Germany . |

*Primary Examiner*—Lincoln Donovan
*Attorney, Agent, or Firm*—Robert W. Becker & Associates

[57] ABSTRACT

An adaptor for contacting a card-shaped support, having electronic components connected thereto, to a PCMACIA-standard connector of a computing unit has a housing shaped as a computer expansion card having opposed first and second end faces and opposed longitudinal sides connecting the first and second end faces. The housing has an insertion slot at the first end face for receiving the card-shaped support. The housing has a plug-in contact at the second end face of opposite the insertion slot. The printed ciruit board is mounted in the housing. It is electrically connected to the plug-in contact. The printed circuit board includes contact elements for contacting the electronic components of the card-shaped support. A first one of the longitudinal sides has an open portion adjacent to the first end face. A second one of the longitudinal sides has an opening allowing insertion of the card-shape support into the housing in a plane of the housing and angled to the longitudinal sides.

10 Claims, 2 Drawing Sheets

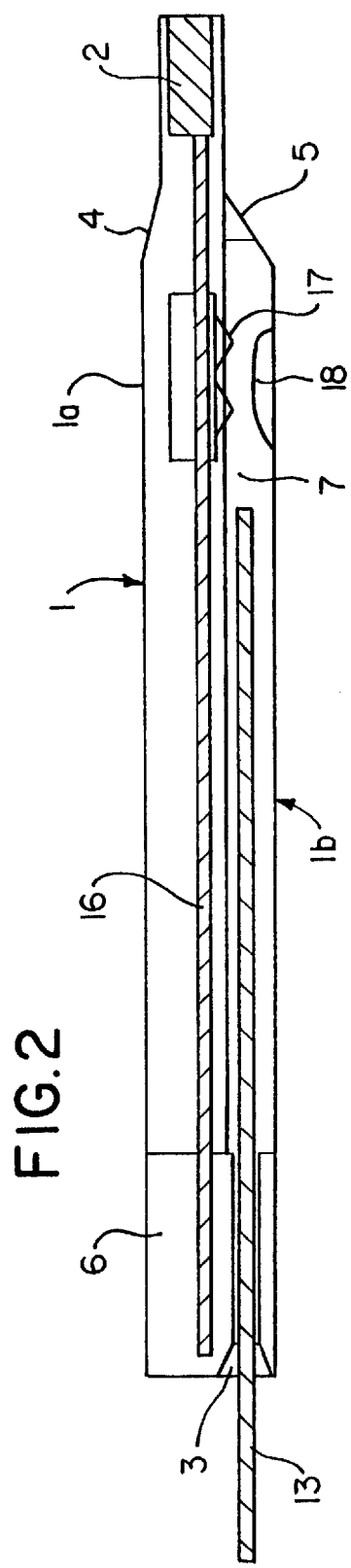
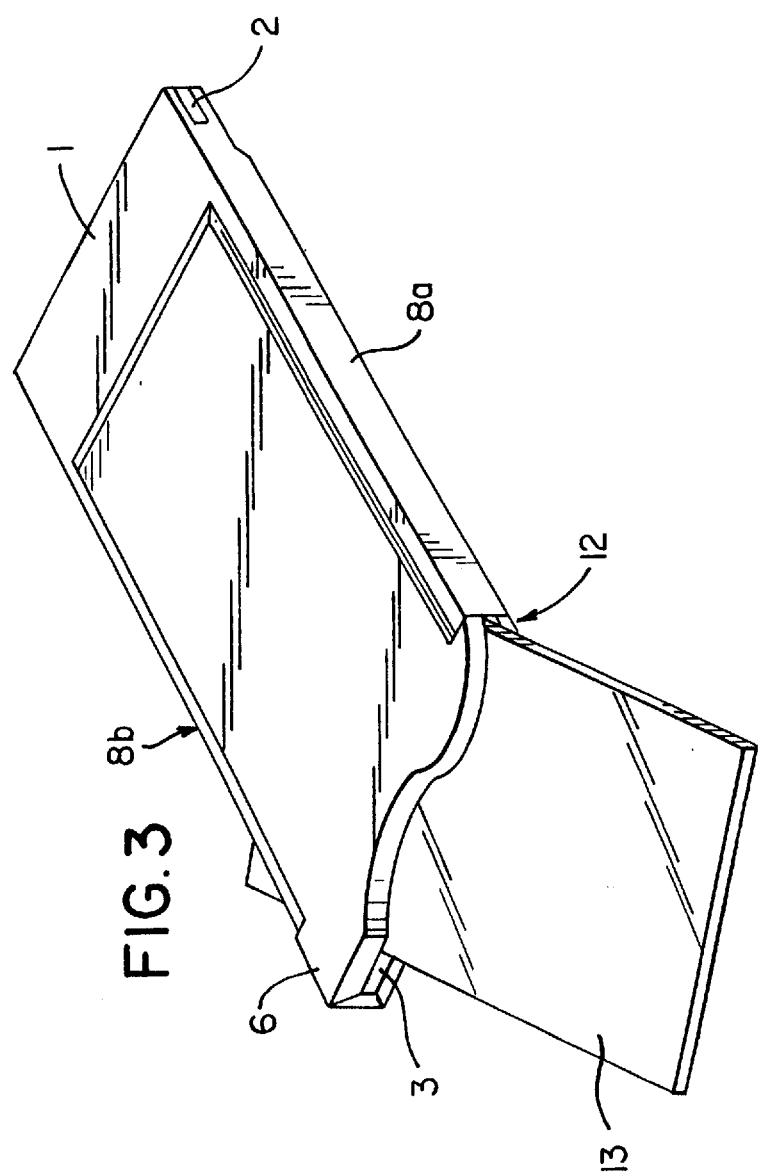

ADAPTOR FOR CONTACTING CARD-SHAPED SUPPORTS

BACKGROUND OF THE INVENTION

The present invention relates to an invention for contacting card-shaped supports of electronic components, especially of chip cards, to a connector of a computing unit such as a notebook computer, whereby the connector is preferably according to PCMCIA standard. The adaptor is comprised of a housing shaped like a computer expansion card. At one end face it has an insertion slot for receiving the card-shaped support and at the opposite end face has a plug-in contact for contacting the notebook or other computing unit. A printed circuit board is provided in the housing and is electrically connected to the plug-in contact. The printed circuit board is provided with contact elements for contacting the electronic components of the support.

In the context of further miniaturization in the area of computer technology electronic components are often arranged on card-shaped supports in order to provide for variability and transportability. Common are supports according to the so-called PCMCIA standard that refers to cards having a standardized matrix-like contact field and which can receive, depending on the application, various electronic components. Such cards are, for example, used as memory extension cards, hard drive cards, modem cards etc. The connection to a data processing unit is realized by a PCMCIA plug-in contact that effects together with a PCMCIA slot of the data processing unit a mechanical and electric contacting.

Also common are so-called chip cards which comprise an integrated circuit (IC) and have large surface contact fields for contacting respective reading units. Known applications for such chip cards are presently telephone cards, authorization cards or so-called charge cards.

Adaptor systems are also known in the prior art which allow to connect a chip card to a PCMCIA standard connector of a data processing system. For this purpose, PCMCIA cards are known which are provided with a slot for a chip card whereby in the area of the slot at the exposed surface a field of contact elements for the electronic components of the chip card are provided. By placing the chip card onto the PCMCIA card a connection of the chip card to a PCMCIA standard connector of a data processing system is thus possible. It is disadvantageous that the contact elements of the PCMCIA card, when the chip card is not present, are exposed and that due to lack of guiding of the chip card a safe contacting can not be ensured.

From German patent application 43 10 517 it is further known to enlarge the area opposite the PCMCIA contact field to such an extent that a guide slot for a chip card is formed. With this proposal, however, it is not ensured that the chip card is prevented from tilting out of the guiding plane in a lateral or an upward direction. Inasmuch as inner guide plates are suggested, it can not be prevented that the chip cards upon insertion hit these plate elements so that a safe contacting and a long service life cannot be ensured.

It is therefore an object of the present invention to improve an adaptor of the aforementioned kind such that, while avoiding the aforementioned disadvantages, a safe and secure guiding and a simple and comfortable manipulation of a card-shaped support results.

SUMMARY OF THE INVENTION

The adaptor for contacting a card-shaped support, having electronic components connected thereto, to a PCMCIA-standard connector of a computing unit according to the present invention is primarily characterized by:

A housing shaped as a computer expansion card having opposed first and second end faces and opposed longitudinal sides connecting the first and second end faces;

The housing having an insertion slot at the first end face for receiving the card-shaped support;

The housing having a plug-in contact at the second end face opposite the insertion slot;

A printed circuit board mounted in the housing;

The printed circuit board electrically connected to the plug-in contact;

The printed circuit board comprising contact elements for contacting the electronic components of the card-shaped support;

A first one of the longitudinal sides having an open portion adjacent to the first end face;

A second one of the longitudinal sides having an opening allowing insertion of the card-shaped support into the housing in a plane of the housing and angled to the longitudinal sides.

The housing has a top and a bottom and the bottom, in the area of the open portion, projects past the top to form a lower lip.

Advantageously, the lower lip has at least one clamping projection.

At least one of the bottom and the top has a recessed portion adjacent to the plug-in contact.

The second longitudinal side preferably has a lateral, widened portion adjacent to the first end face.

The lateral widened portion and the open portion are spaced at a same distance to the second end face.

The opening extends from the lateral, widened portion to the recessed portion.

The opening ends at an upper edge of the bottom.

The opening preferably has a height matching the height of the insertion slot.

The lower end of the insertion slot preferably is flush with an upper end of the bottom.

According to the present invention, the housing at the end face having the insertion slot is provided at one of its longitudinal sides with an open portion and the opposite longitudinal side is provided with an opening that allows a slanted insertion of the support.

With such an embodiment and exact positioning of the card-shaped support, for example, a chip card, is ensured by providing abutment and guiding surfaces on both sides for the support or chip card. Furthermore, because of the open design of the housing in the area of the insertion slot as well as at the opposite longitudinal side, a comfortable insertion of a card is ensured because it can be inserted not only axially (in the longitudinal direction) but also slightly tilted into the adaptor. By providing a closed side within the insertion area, a chip card, even when inserted in a slanted position, is forced into an axial position and subsequently is guided by the closed longitudinal side of the housing as well as in the plane of the housing in a defined manner in order to be thus securely contacted.

In a preferred embodiment, the bottom of the housing in the insertion area for the card-shaped support is exposed and forms a lower lip that projects forwardly so that the thus resulting projection allows a placement onto and thus a secure insertion of the card. In order to prevent sliding of the card out of the insertion slot and increase thus the operational safety, it is suggested that the exposed lower lip has at least one clamping projection.

According to a further feature of the invention the bottom and/or top of the housing in the area of the plug-in is provided with a recessed portion. This has the advantage that the slant provided by the recessed portion forces the inserted card toward the contact elements of the printed circuit board so that the contacting safety is further substantially increased.

In another advantageous embodiment of the invention, the housing is provided with a lateral, widened portion at the longitudinal side opposite the open portion in order to provide a secure positioning of the adaptor at a notebook computer or a similar computing unit. For this purpose, it is furthermore suggested that in the longitudinal direction of the housing the lateral, widened portion extends from the end face in which the insertion slot is provided to the level where the end face of the opposite closed longitudinal side is positioned. The lateral, widened portion and the open portion thus have the same spacing from the opposite end face (distance A). This has the advantage that the open portion that simplifies insertion of the support or card is positioned external to the notebook housing when the adaptor has been inserted into a notebook etc.

Expediently, the opening extends from the lateral, widened portion to the recessed portion so that an inserted support (chip-card) at this side is substantially visible from the exterior in order to provide a visual control of proper positioning of the support in the adaptor. Advantageously, the opening extends to the upper longitudinal edge of the bottom of the housing in order to prevent the support element to be inserted from hitting an upwardly extending longitudinal edge of the bottom.

Finally, it is suggested that the opening has a height which corresponds to the height of the insertion slot in order to provide for an optimal space usage within the housing for the electronic components connected to the circuit board. For this purpose, it is further suggested that the insertion slot ends flush with the upper edge of the bottom of the housing.

BRIEF DESCRIPTION OF THE DRAWINGS

The object and advantages of the present invention will appear more clearly from the following specification in conjunction with the accompanying drawings, in which:

FIG. 2 shows the adaptor with partly inserted chip card in a schematic cross-sectional view;

FIG. 3 shows the adaptor with a chip card inserted at a slant to the longitudinal sides in a perspective view.

DESCRIPTION OF PREFERRED EMBODIMENTS

Figure 1:
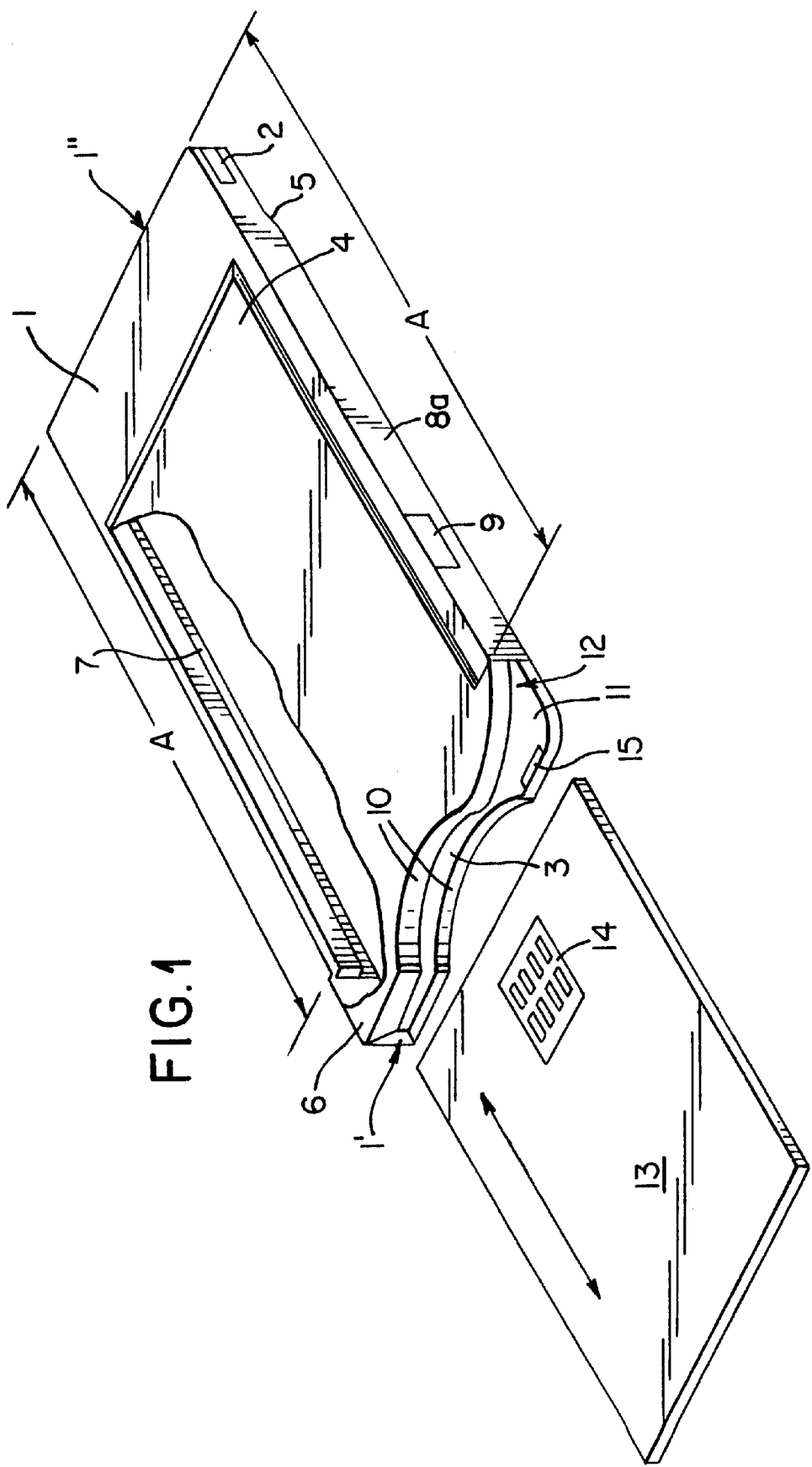
FIG. 1 shows an adaptor and a chip card in a perspective view.

The invention will now be described in detail with the aid of a specific embodiment represented in FIGS. 1 through 3.

The adaptor represented in FIG. 1 has a housing 1 with dimensions according to the PCMCIA card standard, for example, of the type II. The housing 1 has at its narrow end face 1" a PCMCIA plug-in contact 2 and at the opposite end face 1' the insertion slot 3. The top 1a of the housing 1 is provided with an upward projection 4 while the bottom 1b of the housing 1 in the area of the PCMCIA plug-in contact 2 is provided with a recessed portion 5. As can be seen in FIG. 1, the left longitudinal side 8b of the housing 1 is provided with an opening 7 adjacent to a lateral, widened portion 6. Opposite thereto the right longitudinal side 8a is closed with the exception of an opening 9 for insertion of a plug-in card. The end face 1' having the insertion slot 3 is provided centrally with a grip recess 10 having at the bottom of the housing 1 a projecting respectively, exposed lower lip 11 so that an open portion 12 opposite the closed lateral, widened portion 6 is provided at the housing 1. The lateral widened portion 6 and the open portion 12 have the same spacing A to the oppositely arranged end face 1". A chip card 13 also shown in FIG. 1 has a large surface area contact field 14 and can be inserted or removed in the direction of the shown double arrow into the housing 1 across a clamping projection 15 at the projecting lower lip 11 of the housing 1.

In the interior of the housing 1 a printed circuit board 16 is positioned which is electrically connected by soldered connections to the PCMCIA plug-in contact 2. The circuit board 16 extends parallel to the chip card 13 to be inserted, as shown in FIG. 2. The circuit board 16 is provided on one side or both sides with electronic components so that for the same external dimensions of the adaptors an optimal adaptation of the employed electronics to the different applications is possible. Furthermore, the printed circuit board 16 comprises contact elements 17 for contacting the contact field 14 of the chip card 13. Due to the recessed portion 5 in the area of the PCMCIA plug-in contact a guide slant for the chip card 13 to be inserted is provided so that the contact field 14 of the chip card 13 can be pressed against the contact elements 17 of the printed circuit board 16 when the chip card 13 is completely inserted into the adaptor. The pressure springs 18 which are positioned substantially opposite the contact elements 17 of the printed circuit board 16, provide an additional pressing force acting on the chip card in the contacting area so that a safe contacting of the chip card 13 within the adaptor is ensured. In order to dissipate static voltage from the card surface even before contacting, the pressure springs 18 are electrically contacted. Furthermore, the clamping projecting 15 provided at the exposed lower lip 11 provides for clamping of the chip card 13 in the inserted state so that even when vibrations occur in a portable notebook computer a protection of the chip card 13 against sliding out of the insertion slot is provided.

In the embodiment represented in FIGS. 1 and 2 a second insertion area in the form of opening 9 for a so-called plug-in card is provided. With this optional design it is thus possible to insert at the same time two chip cards whereby, for example, one serves as an authorization card for the other. Alternatively, it is also possible to insert two chip cards simutanueously into the correspondingly embodied insertion slot 3 and to contact them with corresponding contacting elements 17 so that the authorization card is of the same design and size as, the other chip card.

The inventive design of the insertion area of the housing 1 with the open portion 12 on one side and the oppositely arranged closed lateral, widened portion 6 provides a simple and comfortable insertion of the chip card 13 into the housing 1 because the chip card 13 can be inserted not only strictly axially as required with conventional adaptors but also at a slight angle to the axial longitudinal extension as shown in FIG. 3. The opening 7 at the longitudinal side 8b of the housing 1 allows penetration of the chip card 13 while the closed lateral, widened portion 6 provides lateral guiding. In order to complete the insertion of the slantedly inserted chip card 13 into the housing 1, it is only necessary to press it against the closed longitudinal side 8 of the housing 1 which from this point on serves as an abutment surface for the chip card 13.

Due to the projecting or exposed lower lip 11, the chip card 13 can also be placed onto the adaptor in a vertically slanted position so that an especially fast insertion of the card 13 into the adaptor is possible.

The closed longitudinal side 8 of the housing 1 provides the adaptor with great stability in addition to a safe guiding of the chip card 13 to be inserted. By eliminating the lateral, widened portion which in conventional adapters is provided at the side where inventively the open portion 12 is positioned, the inventive adaptor when inserted into, for example, a notebook, provides a free space relative to a notebook housing so that a much simpler removal of the inserted adaptor is possible. In the shown embodiment the open portion 12 and the closed longitudinal side 8a are positioned at the right side of the adaptor and the closed lateral, widened portion 6 and the longitudinal side 8b with the opening 7 are provided on the left side of the housing in the drawing. However, the opposite arrangement is also possible. It is also possible to embody the housing 1, instead of being a unitary housing, as shown in the embodiments, in the form of a two-part housing by providing the top and bottom of the housing as respectively shaped cover elements.

The specification incorporates by reference the disclosure of German priority document 297 04 984.4 of Mar. 19, 1997.

The present invention is, of course, in no way restricted to the specific disclosure of the specification and drawings, but also encompasses any modifications within the scope of the appended claims.

What is claimed is:

1. An adaptor for contacting a card-shaped support, having electronic components connected thereto, to a PCMCIA-standard connector of a computing unit, said adaptor comprised of:

a housing shaped as a computer expansion card having first and second end faces opposed to one another and parallel longitudinal sides opposed to one another and connected to said first and second end faces;

said housing having an insertion slot at said first end face for receiving the card-shaped support;

said housing having a PCMCIA plug-in contact at said second end face opposite said insertion slot;

a printed circuit board mounted in said housing;

said printed circuit board electrically connected to said PCMCIA plug-in contact;

said printed circuit board comprising contact elements for contacting the electronic components of the card-shaped support;

a first one of said longitudinal sides having an open portion adjacent to said first end face;

a second one of said longitudinal sides having an opening in the vicinity of said first end face, wherein said open portion and said opening allow insertion of the card-shaped support into said housing in a plane of said housing and at a slant to said parallel longitudinal sides such that the card-shaped support is able to penetrate said opening.

2. An adaptor according to claim 1, wherein said housing has a top and a bottom and wherein said bottom in the area of said open portion projects past said top to form a lower lip.

3. An adaptor according to claim 2, wherein said lower lip has at least one clamping projection.

4. An adaptor according to claim 2, wherein at least one of said bottom and said top has a recessed portion adjacent to said plug-in contact.

5. An adaptor according to claim 1, wherein said second longitudinal side has a lateral, widened portion adjacent to said first end face, wherein said lateral widened portion is positioned between said first end face and said opening and wherein said lateral widened portion provides lateral guiding for the card-shaped support inserted at a slant.

6. An adaptor according to claim 1, wherein said lateral widened portion and said open portion are spaced at a same distance to said second end face.

7. An adaptor according to claim 1, wherein said opening extends from said lateral, widened portion to said recessed portion.

8. An adaptor according to claim 1, wherein said opening ends at an upper edge of said bottom.

9. An adaptor according to claim 1, wherein said opening preferably has a height matching a height of said insertion slot.

10. An adaptor according to claim 1, wherein a lower end of said insertion slot is preferably flush with an upper end of said bottom.

* * * * *